United States Patent Office 3,043,649
Patented July 10, 1962

3,043,649
PROCESS FOR DYEING POLYHYDROXYLATED MATERIALS AND PREPARATIONS THEREFOR
Jacques Wegmann, Basel, Switzerland, assignor to Ciba Corporation, a corporation of Delaware
No Drawing. Filed Feb. 7, 1958, Ser. No. 713,804
Claims priority, application Switzerland Feb. 15, 1957
17 Claims. (Cl. 8—54.2)

This invention relates to a process for dyeing polyhydroxylated materials, such as cellulosic textile materials, by the known printing or foularding methods, in which the goods are to be dyed are impregnated with the whole of the dyestuff solution required to produce the desired tint or are printed with a dye color containing the dyestuff and the dyestuff so applied is fixed on the goods.

The present invention is based on the observation that very valuable dyeings and prints can be produced on polyhydroxylated fibrous materials by printing and foularding methods by using a dyestuff solution or printing paste which contains urea, and also contains an organic dyestuff which is capable of being fixed on the fibrous material with the formation of a chemical bond, and by subjecting the material, if desired, after it has been partially dried, to the action of dry heat.

The dyestuff solution or printing paste may as aforesaid contain urea and, in addition, a dyestuff which is capable of being chemically fixed on the fibrous material to be dyed. As organic dyestuffs of this kind there may be mentioned those which, for example, owing to the presence of an epoxy group, an ethylene-imine or ethylene-imide group, a double bond in $\alpha:\beta$-position relatively to a —CO— or —SO$_2$— group or a labile substituent, is capable of reacting with the material under the conditions of the process. There may be mentioned more especially organic dyestuffs which contain an ethylene-imine-group, an acrylic group, especially an acrylamino group, a vinyl-sulfone group or a labile substituent easily capable of splitting up with the taking over of the electron pair of the bond, and of which groups or substituents more than one may be present in the dyestuff molecule.

As labile substituents which are capable of splitting up with the taking over of the electron pair of the bond, there may be mentioned, for example, aliphatically bound sulfonyloxy groups and halogen atoms, especially an aliphatically bound chlorine atom. These labile substituents are advantageously present in the γ- or β-position of an aliphatic radical which is bound to the dyestuff molecule directly or through an amino group or an —SO$_2$— group, or bound to the nitrogen atom of a carboxylic acid amide group or a sulfonic acid amide group. Those dyestuffs of this kind which contain a halogen atom as a labile substituent may alternatively contain this exchangeable halogen atom in an aliphatic acyl group, for example, in an acetyl group or in the β-position of a propionyl group or preferably in a heterocyclic radical, and in the latter case there may be mentioned dyestuffs which contain a heterocyclic ring which is preferably monohalogenated. In this preferred form of the process there may therefore be used dyestuffs which contain a labile chlorine atom bound to a heterocyclic ring, for example, to a pyrimidine or phthalazine ring or especially a triazine ring. There may be mentioned, for example, dyestuffs which contain a 2-phenly-4-chloro-1:3:5-triazine nucleus, and especially dyestuffs which contain a monochloro-1:3:5-triazine nucleus, and especially dyestuffs which contain a monochloro-1:3:5-triazine nucleus of the formula (1)
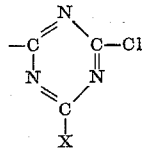

in which X represents a substituted hydroxyl group or advantageously a substituted or unsubstituted amino group.

The nucleus of the Formula 1 may be bound to the dyestuff molecule through a sulfur or oxygen atom or advantageously through a nitrogen bridge, for example, through an

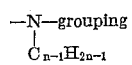

(in which n is a positive whole number), which may itself be bound to the dyestuff molecule directly or through a bridge member, for example, through an alkylene radical or through an —SO$_2$—group.

In addition to at least one labile substituent of the kind defined above the dyestuffs to be used in the process of this invention may contain at least one acid group, preferably one strongly imparting solubility in water, such as an acylated sulfonic acid amide group, a carboxylic acid group or more especially a sulfonic acid group. There are advantageously used dyestuffs which contain more than one such group, and which may belong to a very wide variety of classes, for example, stilbene dyestuffs, thioxanthone dyestuffs, azine dyestuffs, dioxazine dyestuffs, dyestuffs of the porphyrazine series such as phthalocyanine dyestuffs, and above all acid anthraquinone dyestuffs and azo-dyestuffs including metal-free or metalliferrous monoazo- or polyazo-dyestuffs. Especially good results are obtained with soluble dyestuffs which possess no affinity or no pronounced affinity for cotton, for example, water-soluble 1:2-chromium- or cobalt-compounds of monoazo-dyestuffs which contain a reactive group, for example, a monochloro- or dichloro-1:3:5-triazine radical.

A large number of dyestuffs of the above kind are known or can be made by methods in themselves known, for example, from dyestuff components which already contain a labile substituent, or the labile substituent or a radical containing such labile substituent may be introduced into the dyestuff molecule by a method in itself known after the preparation of the dyestuff. Thus, for example, there are obtained by reacting azo-dyestuffs or anthraquinone dyestuffs, which contain a reactive —NH$_2$ group, with cyanuric chloride (2:4:6-trichloro-1:3:5-triazine) or with a primary condensation product of cyanuric chloride which contains two chlorine atoms and an organic radical instead of the third chlorine atom of cyanuric chloride, valuable condensation products which contain an exchangeable chlorine atom and are suitable for dyeing in the process of this invention. The group of dyestuffs used in the process, which contain a sulfonylated hydroxyl group can be made, for example, by reacting one molecular proportion of a dyestuff, which contains an hydroxyalkyl group, for example, a sulfonic acid N-hydroxyalkyl-amide group, with at least one molecular proportion of an organic sulfonic acid halide, for example, tosyl chloride, benzene sulfonyl chloride or ethane sulfonyl chloride, in such manner that the hydroxyl group is acylated.

With the use of foularding solutions or printing pastes containing the aforesaid dyestuffs and urethanes or amides there can be dyed on a foulard or printed polyhydroxylated, especially cellulosic, fibrous materials, including synthetic fibers, for example, of regenerated cellulose (viscose) or natural materials, for example, linen or especially cotton, or mixtures, such as mixed fabrics of cotton, and, for example, superpolyester fibers. There are advantageously used aqueous solutions of the dyestuffs in question which contain from about 20 to about 27% by weight of urea. Such solutions which may contain a more or less neutral, and preferably inorganic, salt such as an alkali metal chloride or sulfate, and, if desired, an acid-binding agent, especially an inorganic acid-binding agent, such as an alkali metal carbonate, alkali metal phosphate, alkali metal borate or perborate or a mixture of such agents, and especially buffer mixtures of such agents, are used to impregnate the goods to be dyed, advantageously in the cold or at a moderately raised temperature, or, if no alkali is present, at a raised temperature, for example, at 60–80° C., and the material is squeezed in the usual manner, advantageously to an extent such that the impregnated material retains 0.5 to 1.3 times its original weight of dyestuff solution.

The fixation of the dyestuff on the goods impregnated with the dyestuff solution is carried out after the impregnation. For this purpose, for example, the impregnated material, after preliminary partial drying, may be heated, for example, in a current of hot air above 100° C. for a short time, for example, a few minutes, or for a longer time. When the fixation is carried out for a short time at a relatively high temperature, for example, about 140° C. or for a longer period at a lower temperature, it is of advantage to use a large amount, that is to say, more than 10%, of the urea.

The solutions used for impregnation may be prepared by taking up in water simultaneously or in succession the desired quantities of urea and dyestuff and, if desired, of more or less neutral inorganic salt. Alternatively, the dyestuff and the urea may be worked up into paste form or advantageously into a dry preparation. Such a preparation for use in preparing an impregnating solution may contain, in addition to the urea, a buffer salt or a mixture thereof, which is capable, for example, of yielding alkali upon being heated.

Instead of applying the aforesaid dyestuffs to the material by impregnation they may be applied by printing. For this purpose there is used, for example, a printing color which contains, in addition to the customary printing assistants, for example, wetting agents and thickening agents, and, if desired, finely dispersed non-reactive dyestuffs, urea and at least one of the aforesaid dyestuffs and, if desired, an acid-binding agent or a substance capable of yielding such an agent.

As auxiliary agents for making printing pastes there may be mentioned, for example, thickening agents, such as alkoxy-celluloses, for example, methyl-cellulose, or tragacanth, alginates, or the like. By the process of this invention there are produced on polyhydroxylated, especially cellulosic, materials with those of the above defined dyestuffs that possess no affinity or no pronounced affinity for cotton very valuable strong and usually very full dyeings and prints having excellent properties of wet fastness and of very good fastness to light. If the aforesaid urea is not used, there are usually obtained cloudy weak dyeings and prints.

In certain cases it may be of advantage to subject the dyeings or prints obtained by the process to an aftertreatment. Thus, for example, the dyeings so obtained are advantageously soaped, whereby any incompletely fixed dyestuff is removed. When the dyeings or prints are produced with dyestuffs containing metallizable groups, the dyeing or print may be subjected to aftertreatment with an agent yielding a heavy metal, especially an agent yielding copper.

The following examples illustrate the invention, the parts and precentages being by weight, and although as a rule the dyestuffs are referred to in the form of the free acids they are used in the form of their alkali metal salts.

*Example 1*

3 parts of the dyestuff of the formula

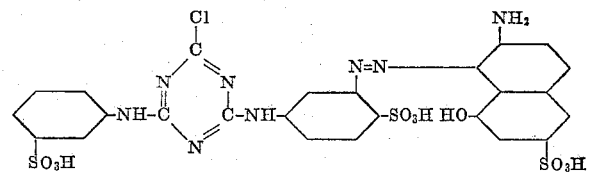

and 2 parts of sodium carbonate are dissolved in 25 parts of urea and 75 parts of water. A cotton fabric is impregnated with the resulting solution, then squeezed to a weight increase of 75%, and dried at 80° C.

The material is then subjected to the action of dry heat at 100° C. for 3 minutes, and is then rinsed and soaped at the boil. There is obtained a yellowish red dyeing which is fast to light.

By subjecting the material to the action of dry heat for 3 minutes at 140° C. the same result is obtained.

If the fabric is fixed by subjecting it for one hour to a temperature of 80° C. in a dry atmosphere, there is obtained a fixing effect which resembles that obtained as described above.

*Example 2*

3 parts of the dyestuff mentioned in Example 1 are dissolved in 25 parts of urea and 20 parts of water. The solution is stirred into 50 parts of an emulsion thickening that is volatile when heated. A cotton fabric is printed with the resulting printing color, dried, and fixed for one minute at 200° C. The material is then rinsed and soaped at the boil. There is obtained a strong red print which is fast to boiling.

*Example 3*

2 parts of the dyestuff of the formula

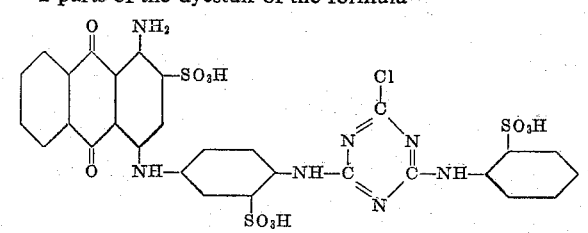

and 2 parts of sodium carbonate are dissolved in 25 parts of urea and 75 parts of water. A cotton fabric is impregnated with the resulting solution, and is then squeezed to a weight increase of 75% and dried at 90–100° C. The dyeing is then subjected to the action of dry heat at 140° C. for 60 seconds, rinsed and soaped. There is obtained a strong blue dyeing.

By using the dyestuff of the formula

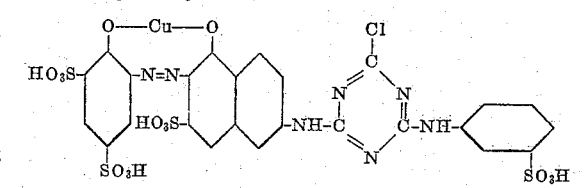

and otherwise proceeding as described above, there is obtained a strong ruby dyeing.

If, after being dried, the material is placed for one hour in a drying cabinet at 80° C., a similarly good result is obtained after rinsing and soaping the material.

A similarly good result can also be obtained by subjecting the fabric for 3 hours to the action of dry heat at 40° C.

By using, instead of a cotton fabric. a fabric of staple fibers of regenerated cellulose, similarly good dyeings are obtained.

Example 4

2 parts of the dyestuff of the formula

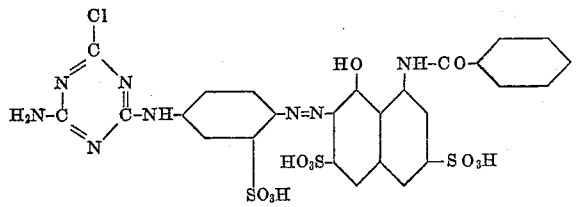

and 1 part of a 10 N-solution of sodium hydroxide are dissolved in 25 parts of urea and 75 parts of water. A cotton fabric is impregnated with the resulting solution, then squeezed to a weight increase of 75%, and dried. After being subjected to heat treatment for 60 seconds at 220° C., the material is rinsed and soaped. There is obtained a violet dyeing which is fast to boiling.

Example 5

2 parts of the dyestuff of the formula

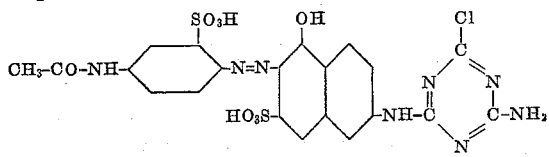

are dissolved with 2 parts of sodium carbonate and 10 parts of urea mixed in 90 parts of water.

A fabric of mercerised cotton is impregnated with the resulting solution, then squeezed to a weight increase of 70%, and dried. The fabric is then subjected to the action of dry heat at 160° C. for 5 minutes, then rinsed and soaped at the boil for 15 minutes in a solution of 0.3% strength of an ion-free detergent, then rinsed and dried. There is obtained a strong yellowish red dyeing.

By using, instead of the aforesaid dyestuff, 2 parts of the dyestuff of the formula

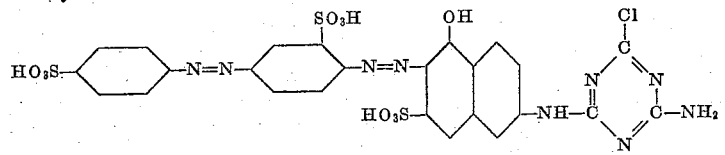

or of the dyestuff obtained by condensing 1 mol of copper phthalocyanine-tetra-sulfochloride with 1–2 mols of 2-amino-4-(3'-aminophenyl)-amino-6-chloro - 1:3:5 - triazine-6-sufonic acid and saponifying the unreacted sulfochloride groups and otherwise proceeding in the manner described above, similarly good results are obtained.

Example 6

2 parts of the dyestuff of the formula

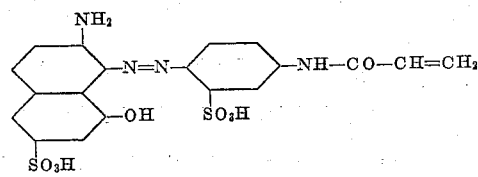

are dissolved with 2 parts of sodium carbonate and 20 parts of urea mixed in 80 parts of water.

A cotton fabric is impregnated with the resulting solution, squeezed to a weight increase of 75%, and dried to an extent such that the material retains about 15% of moisture.

The fabric is then maintained for one hour in a drying cabinet at 80–90° C., and rinsed and soaped at the boil for 15 minutes in a solution of 0.3% strength of a non-ionic detergent. There is obtained a red dyeing which is fast to light and washing.

By using, instead of the aforesaid dyestuff, the same quantity of the dyestuff of the formula

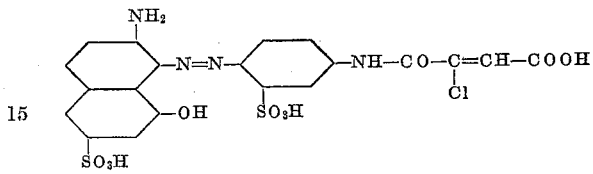

a similarly good result is obtaind.

By using, instead of the aforesaid dyestuff 2 parts of the dyestuff of the formula

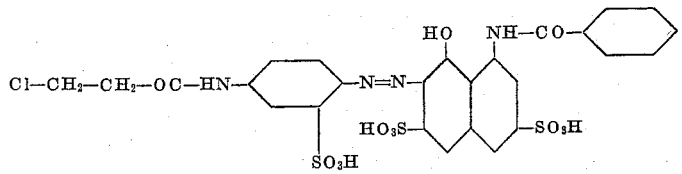

or of the dyestuff of the formula

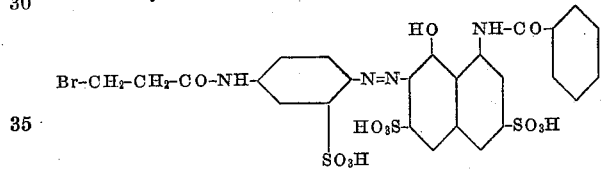

there is obtained a strong red-violet dyeing which is fast to washing, and the same quantity of the 1:2-chromium complex of the dyestuff of the formula

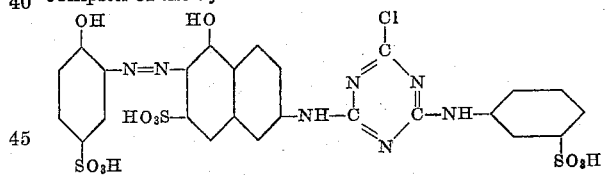

yields a currant dyeing and a corresponding quantity of the 1:2-cobalt complex of the same dyestuff yields a

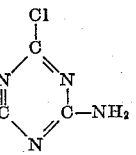

brownish bordeaux dyeing, which also has an excellent fastness to washing and light.

Example 7

2 parts of copper phthalocyanine sulfonic acid-N:β-chlorethylamide-trisulfonic acid are dissolved with 2 parts of sodium carbonate and 20 parts of urea mixed in 80 parts of water. A mercerised cotton fabric is impregnated with the resulting solution and squeezed to a weight increase of 75%. After being dried the fabric is subjected to the action of dry heat for 5 minutes at 140° C. and is then rinsed and soaped at the boil. There is obtained a pure turquoise blue dyeing of excellent fastness to washing.

By preparing a solution of 2 parts of the dyestuff of the formula

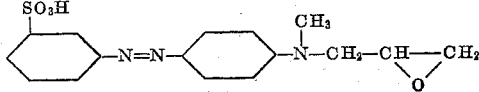

which is obtained as described in U.S. Patent No. 2,139,787, 10 parts of a 10 N-solution of caustic soda and 20 parts of urea in 70 parts of water, and applying the solution to a cotton fabric in the manner described above, there is obtained a strong reddish yellow dyeing.

*Example 8*

2 parts of the dyestuff of the formula

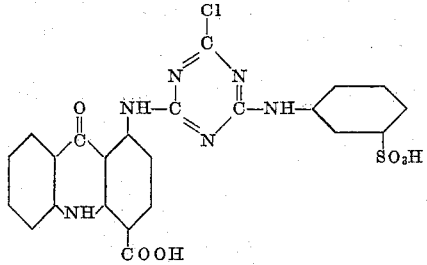

are dissolved with 20 parts of urea mixed in 100 parts of water. After the addition of 2 parts of sodium carbonate a cotton fabric is impregnated with the solution at 60° C., then squeezed to a weight increase of 75%, and dried. The fabric is then subjected to the action of dry heat for 5 minutes at 140° C., then rinsed, soaped at the boil, rinsed and dried. There is obtained a greenish yellow dyeing which is fast to washing.

*Example 9*

2 parts of the dyestuff of the formula

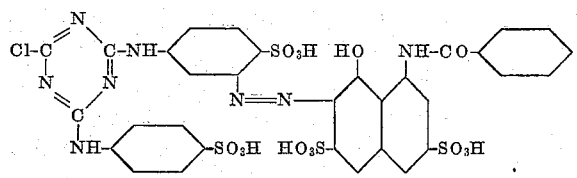

are dissolved with 20 parts of urea mixed in 80 parts of water and 2 parts of sodium carbonate are added. A mercerised cotton fabric is foularded with the resulting solution, squeezed to a weight increase of 60%, and, after being dried to a residual moisture content of about 30%, is passed through a nozzle drier supplied with dry air at about 160° C., the period of passage through the drier being about 20 seconds. The fabric is then rinsed, soaped, rinsed again and dried, and a full red dyeing of good fastness to washing is obtained.

*Example 10*

In 1000 parts of an aqueous solution containing, per liter, 200 grams of urea and 16 grams of the dyestuff of the formula

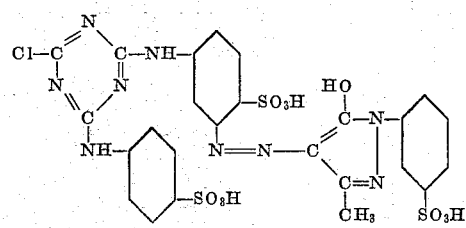

there are dissolved 20 parts of calcined sodium carbonate and 30 parts of the dyestuff of the formula

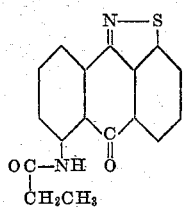

A mixed fabric of 35 parts of cotton and 65 parts of Dacron is foularded at 50–60° C. with the solution so prepared, and the fabric is then dried and maintained for 4 minutes at 180° C. After the usual after-treatment lasting for 20 minutes in an aqueous solution containing, per liter, 2 grams of a non-ionic detergent and 2 grams of calcined sodium carbonate, the Dacron/cotton mixed fabric is rinsed and dried. There is obtained a deep yellow level dyeing.

*Example 11*

2 parts of the chromium compound containing in complex union per 1 atom of chromium, 2 molecules of the dyestuff of the formula

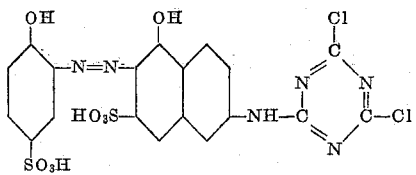

are dissolved with 20 parts of urea in 80 parts of water. After adding 2 parts of sodium bicarbonate, a cotton fabric is impregnated with the resulting solution, then squeezed to a weight increase of 75% and dried. The material is then subjected to the action of dry heat at 100° C. for three minutes, and is then rinsed, soaped at the boil and dried. There is obtained a currant dyeing which is fast to washing and light.

By using, instead of the above chromium complex, the corresponding 1:2-cobalt complex there is obtained a brown-red dyeing which has also good fastness properties.

What is claimed is:

1. Process for dyeing and printing polyhydroxylated cellulosic materials by subjecting to the action of dry heat the preliminarily substantially dried material on which there has been deposited a coloring mixture consisting essentially of (a) from about 20 to about 27% of its weight of urea, (b) an alkali and (c) a water-soluble organic dyestuff which contains a single reactive halogen atom.

2. Process for dyeing and printing polyhydroxylated cellulosic materials wherein there is applied to the materials a coloring mixture consisting essentially of (a) from about 20 to about 27% of its weight of urea, (b) an alkali and (c) a water-soluble organic dyestuff containing a monochloro-1:3:5-triazine radical, and the material is partially dried and then subjected to the action of dry heat.

3. Process for dyeing and printing polyhydroxylated cellulosic materials wherein the material is padded with a liquor selected from the group consisting of a dyeing solution and a printing paste, which contains an alkali, urea and a water-soluble organic dyestuff containing a monochloro-1:3:5-triazine radical, and the thus padded material is substantially dried and then subjected to the action of dry heat, the quantity of urea being from about 20 to about 27% by weight of the padding liquor.

4. The process of claim 3 wherein the dyestuff is an anthraquinone dyestuff.

5. The process of claim 3 wherein the dyestuff is a monoazo dyestuff.

6. The process of claim 3 wherein the dyestuff is a cupriferous monoazo dyestuff.

7. The process of claim 3 wherein the dry heat is at 40° C. to 220° C.

8. The process of claim 3 wherein the alkali is a member selected from the class consisting of alkali metal carbonates and hydroxides.

9. The process of claim 3 wherein the dyestuff is of the formula

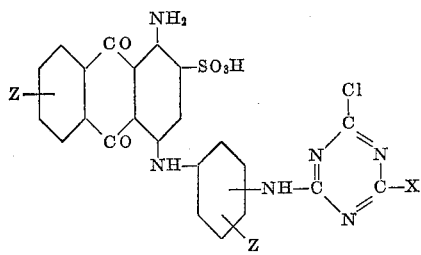

wherein X represents an amino group and at least one of the two Z's a sulfonic acid group.

10. The process of claim 3 wherein the dyestuff is of the formula

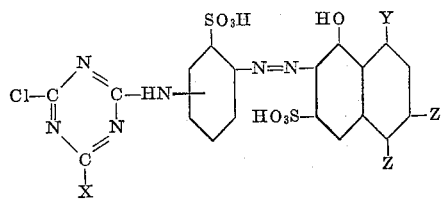

wherein X represents an amino group, Y an acylamino group, one Z hydrogen and the other Z a sulfonic acid group.

11. The process of claim 3 wherein the reactive dyestuff is a complex copper compound of one of the dyestuffs of the formula

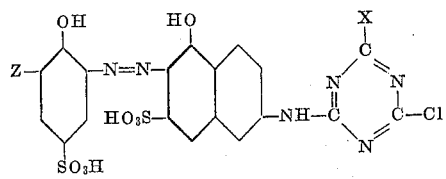

wherein Z represents a member selected from the group consisting of a hydrogen atom and a sulfonic acid group, and X represents an amino group.

12. Process for dyeing and printing cotton wherein the cotton to be dyed and, applied thereto, a dyeing liquor containing urea, an alkali and the dyestuff of the formula

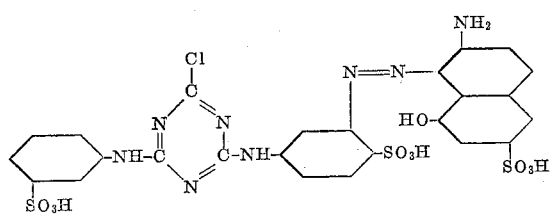

are subjected together after preliminary substantial drying, to the action of dry heat, the amount of urea being from about 20 to about 27% by weight of the padding liquor.

13. Process for dyeing and printing cotton wherein the cotton to be dyed and, applied thereto, a dyeing liquor containing urea, an alkali and the dyestuff of the formula

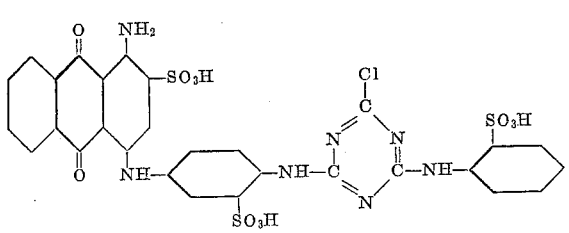

are subjected together, after preliminary substantial drying, to the action of dry heat, the amount of urea being from about 20 to about 27% by weight of the padding liquor.

14. Process for dyeing and printing cotton wherein the cotton to be dyed and, applied thereto, a dyeing liquor containing urea, an alkali and the dyestuff of the formula

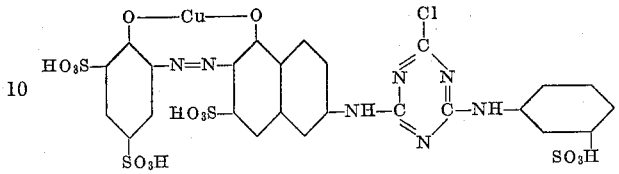

are subjected together, after preliminary substantial drying, to the action of dry heat, the amount of urea being from about 20 to about 27% by weight of the padding liquor.

15. Process for dyeing and printing cotton wherein the cotton to be dyed and, applied thereto, a dyeing liquor containing urea, an alkali and the dyestuff of the formula

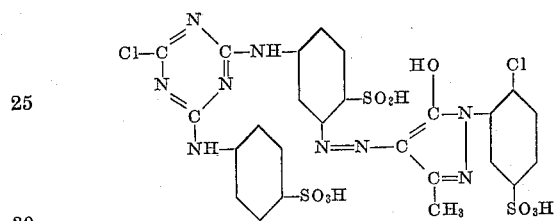

are subjected together, after preliminary substantial drying, to the action of dry heat, the amount of urea being from about 20 to about 27% by weight of the padding liquor.

16. Process for dyeing and printing cotton wherein the cotton to be dyed and, applied thereto, a dyeing liquor containing urea, an alkali and the dyestuff obtained by condensing 1 mol of copper phthalocyanine-tetrasulfochloride with 1–2 mols of 2-amino-4-(3'-aminophenyl)-amino-6-chloro-1:3:5-triazine-6'-sulfonic acid and saponifying the unreacted sulfochloride groups are subjected together, after preliminary substantial drying, to the action of dry heat, the amount of urea being from about 20 to about 27% by weight of the padding liquor.

17. Process for dyeing and printing polyhydroxylated fibrous materials wherein there is applied to a mixed cotton-polyester fabric a member selected from the group consisting of a printing paste and a foularding solution containing, in addition to a finely dispersed pigment dyestuff and from about 20 to about 27 percent of its weight of urea, an alkali and an organic dyestuff which bears a reactive halogen atom, the fibrous material being dried and then subjected to the action of dry heat.

References Cited in the file of this patent

UNITED STATES PATENTS

| | | |
|---|---|---|
| 2,220,402 | Granacher | Nov. 5, 1940 |
| 2,892,670 | Alsberg | June 30, 1959 |
| 2,892,671 | Alsberg | June 30, 1959 |
| 2,895,785 | Alsberg | July 21, 1959 |

FOREIGN PATENTS

| | | |
|---|---|---|
| 531,438 | Canada | Oct. 9, 1946 |

OTHER REFERENCES

Wardle: Textile Colorist, Sept. 15, 1940, page 629.
Haller: Am. Dyest. Rep., vol. 39, No. 4, Nov. 27, 1950, p. 802.
DuPont Technical Bulletin R–26, May 1957, pages 8–9.
Fowler: JSDC, vol. 73, pages 237–247 esp. pages 243, 244, 247, June 1957, first presented to public in England October 5, 1956.